United States Patent
Matarai et al.

(10) Patent No.: US 6,216,725 B1
(45) Date of Patent: Apr. 17, 2001

(54) FLUID PRESSURE CONTROL DEVICE WITH COVER FOR PREVENTING MISOPERATION

(75) Inventors: Yukihiro Matarai; Yoshio Aso; Makoto Ishikawa, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/497,214

(22) Filed: Feb. 3, 2000

(30) Foreign Application Priority Data

Mar. 12, 1999 (JP) .................................................. 11-066529

(51) Int. Cl.$^7$ ...................................................... F16L 35/00
(52) U.S. Cl. ............................ 137/377; 137/382; 251/90; 251/111
(58) Field of Search ................................... 137/382, 377, 137/559, 884; 251/90, 111, 114

(56) References Cited

U.S. PATENT DOCUMENTS 4,253,488 * 3/1981 Leverberg ............................. 137/382
5,417,247 * 5/1995 Tarui et al. ......................... 137/382 X
6,155,287 * 12/2000 Matarai et al. ....................... 137/382

* cited by examiner

Primary Examiner—Kevin Lee
(74) Attorney, Agent, or Firm—Oblon, Spivak, McClelland, Maier & Neustadt, P.C.

(57) ABSTRACT

A cover for preventing misoperation is easily and certainly attached/detached to/from an operating piece for manual operation provided for a fluid pressure control device. It is attached so as not to be lost even when the cover is detached for manual operation. For this purpose, retaining grooves 7a and 7b are formed on the outer face of a plunger-type operating piece 3 provided on the top face of the body 4 so as to be projected. A cylindrical cover 5 is provided with a hook 10 which is resiliently retained by the retaining groove 7a or 7b and a string-shaped connecting member 12 which is connected to the operating piece 3, thereby preventing the cover 5 from being lost. The height of the cover 5 is set to be equal to or higher than that of the operating piece 3 in a non-operating position.

11 Claims, 2 Drawing Sheets

FLUID PRESSURE CONTROL DEVICE WITH COVER FOR PREVENTING MISOPERATION

TECHNICAL FIELD

The present invention relates to a fluid pressure control device with a cover for preventing misoperation such that a cover for preventing misoperation is attached to an operating piece for manual operation in the fluid pressure control device.

DISCUSSION OF BACKGROUND ART

For example, a solenoid-controlled valve for switching a passage of compressed air is usually provided with a manual operation mechanism so that the switching operation can be performed manually in the event of an emergency such as service interruption. The manual operation mechanism has generally one or a plurality of plunger-type operating pieces. By pushing the operating piece, the solenoid-controlled valve is switched.

The operating piece is provided either in a state where it is recessed in the body of a valve or in a state where it is projected to the outside. In the former case, since the operating piece is recessed, there is an inconvenience such that the switching operation has to be performed by using a tool such as a driver. Recently, therefore, the operating piece is often provided in a projected state as the latter case.

When the operating piece is provided in a projected state, although the switching operation can be performed easily by only a finger without using a tool, the operating piece is inadvertently pressed by being touched by a hand or other foreign matter and misoperation is easily caused.

It is therefore necessary to take a measure by attaching, for example, a safety cover to the operating piece. Since the operating piece is small, the safety cover is naturally small and a work to attach or detach the safety cover is not easily. Especially, the cover is requested to be securely retained by the operating piece and not to be easily detached due to vibration or the like when it is attached to the operating piece. It is also requested to be easily attached or detached only by fingers at the time of attachment and detachment. It is also requested that the cover detached is not lost in the case such that the cover is detached and the operating piece is manually operated. A solenoid-controlled valve having a cover which can satisfy all of the requests is not conventionally known.

SUMMARY OF INVENTION

It is a technical object of the invention to provide a fluid pressure control device such as a solenoid-controlled valve having a manual operation mechanism in which a cover for preventing misoperation attached to an operating piece for manual operation can be easily and certainly attached/detached to/from the operating piece and is not lost even when it is detached.

In order to achieve the subject, in the invention, at least one retaining groove is formed on the outer face of a plunger-type operating piece in a manual operation mechanism. A cover attached to the operating piece has: a cylindrical shape with a transparent opening through which the top of the operating piece is seen at the top of the operating piece; a hook resiliently retained by the retaining groove of the operating piece on the inside of the cylinder; and a string-shaped connecting member which is provided on the outer part of the cylinder for preventing the cover from being lost with the tip of the connecting member connected to the operating piece. The height of the cover is set to be equal to or higher than that of the operating piece in a non-operating position.

In the invention having the configuration, when the cover is fit on the operating piece in a state where the tip of the connecting member is connected to the operating piece, the hook is resiliently retained by the retaining groove on the outer face of the operating piece. Consequently, the cover can be easily and securely attached without being detached due to vibration or the like. Since the height of the cover is set to be equal to or higher than that of the operating piece in a non-operating position, the operating piece is recessed in the cover and is not projected to the outside. Even when a hand or other matter touches the cover, the operating piece is not therefore inadvertently switched.

At the time of operating the operating piece, the cover is detached. In this case, when the cover is pulled out with fingers from the operating piece, the hook is resiliently detached from the retaining groove, so that the cover can be easily detached. Since the cover is connected to the operating piece by the connecting member, even when the cover is detached from the operating piece, it is not dropped in a narrow gap around the device or lost.

According to a specific embodiment of the invention, the hook of the cover is formed at the tip of each of a plurality of resilient members extending from the top of the cover to the proximal part.

The connecting member is extended from the top of the cover and has a retaining part which is retained/detached to/from the operating piece at the tip. A notch into which the connecting member is fit in a state where the cover is attached to the operating piece is formed at the proximal periphery of the cover.

It is desirable that finger catching projections which facilitate the pinching of a cover at the time of attachment/detachment are formed on the outer face of the cover.

According to another embodiment of the invention, the operating piece can be locked in a pushed position and has upper and lower retaining grooves on its outer face, thereby enabling the cover to attached so as to be retained in both of the operating position and the non-operating position.

According to further another embodiment of the invention, a plurality of operating pieces are mounted on a fluid pressure control device so as to be close to each other and a plurality of covers corresponding to the operating pieces are integrally formed.

DETAILED DESCRIPTION

Figure 1:
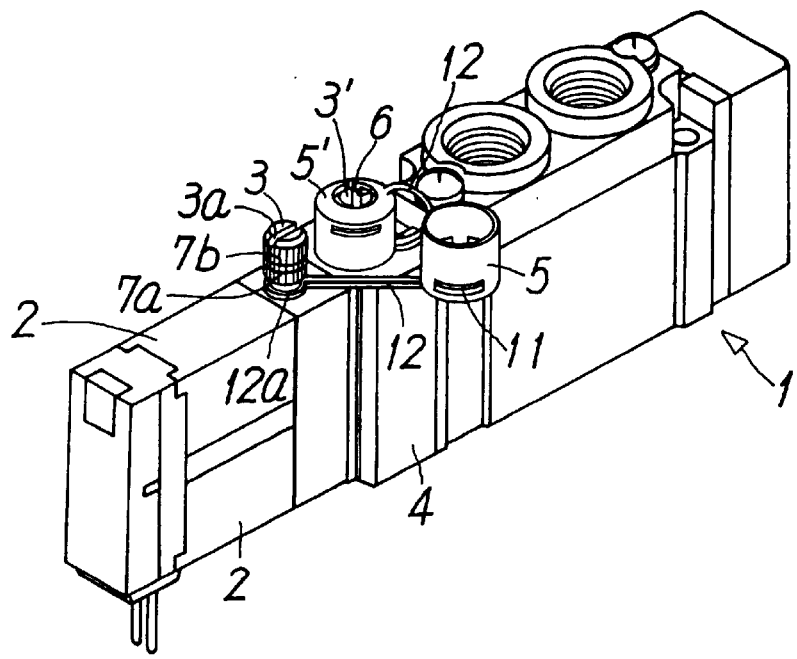
FIG. 1 is a perspective view showing a first embodiment of a fluid pressure control device according to the invention.
Figure 2:
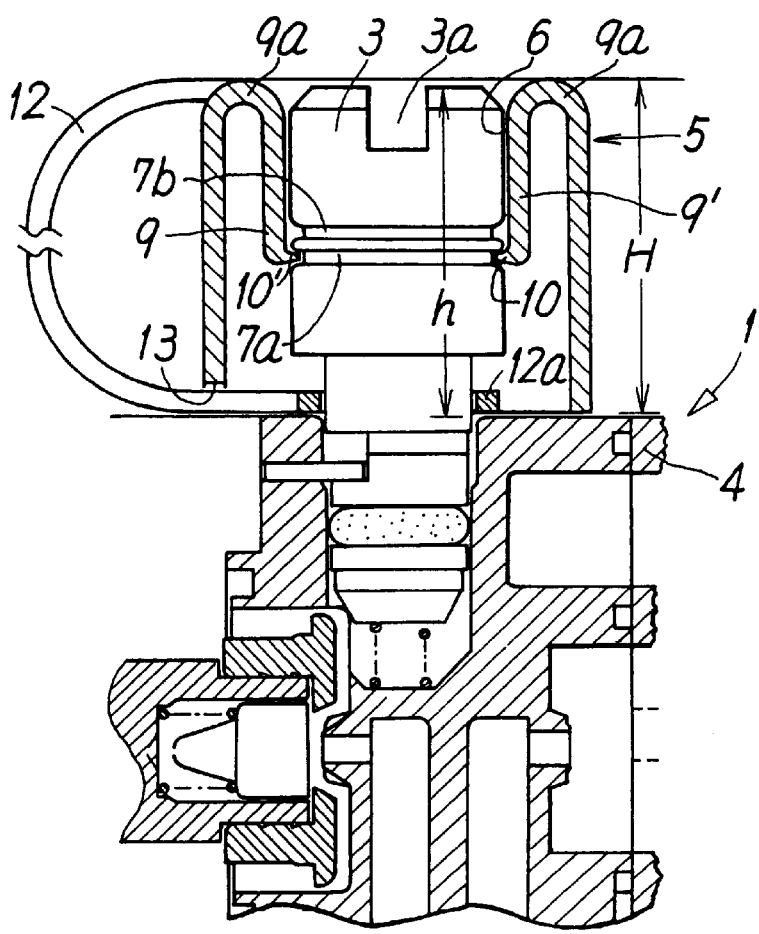
FIG. 2 is an enlarged cross section of the main part of FIG. 1.

Some preferred embodiments of the invention will be described in detail herein below with reference to the drawings. FIGS. 1 and 2 show a first embodiment of the invention. In the embodiment, as a fluid pressure control device, a solenoid-controlled pilot-operated directional control valve 1 having a manual operation mechanism is shown. The directional control valve 1 alternately switches the main valve by two pilot valves 2 and 2' which are solenoid controlled and has two operating pieces 3 and 3' for manual operation corresponding to the two pilot valves 2 and 2'. The operating pieces 3 and 3' are arranged in positions adjacent to each other in the longitudinal direction of the top face of the valve body 4 in a state where they are projected from the top face only by a predetermined height (h). Covers 5 and 5' for preventing misoperation are detachably attached to the operating pieces 3 and 3', respectively.

Each of the operating pieces 3 and 3' has a plunger shape. By being pushed by a predetermined stroke, the operating piece 3 switches the corresponding pilot valve 2 to an operating state. The operating piece 3 is turned by a predetermined angle in a pushed state, it can be locked in a pushed position (operation position). A groove as a mark 3a to recognize the direction is formed on the top face of each of the operating pieces 3 and 3' so that the operating state can be checked.

On the outer face of each of the operating pieces 3 and 3', upper and lower two retaining grooves 7a and 7b are formed with a small interval in the vertical direction. The interval between the retaining grooves 7a and 7b is substantially the same as the press stroke of the operating piece.

On the other hand, each of the covers 5 and 5' has a cylindrical shape having a transparent opening 6 on its top through which the mark 3a on the top of the operating piece 3 can be seen. The height (H) of the cover 5 is set equal to or higher than the height (h) of the operating piece 3 in a not-operated position. When the cover 5 is attached to the operating piece 3, the operating piece 3 is in the cover 5 and is not projected to the outside.

A pair of hooks 10 and 10' to be resiliently retained by the retaining grooves 7a and 7b provided for the operating piece 3 are attached to the inside of the cover 5. The hooks 10 and 10' are formed at the tips of two facing resilient members 9 and 9' which are extended downward via curved parts 9a at the top of the cover 5. By the resiliency of the resilient members 9 and 9', the hooks 10 and 10 are retained/detached by/from the retaining grooves 7a and 7b.

In the positions opposite to each other by 180 degrees on the outer face of the cover 5, a pair of finger catching projections 11 and 11' which facilitate pinching of the cover at the time of attachment/detachment are formed.

Further, at the top of the cover 5, a string-shaped connecting member 12 is connected so as to extend to the outside. A ring-shaped or hook-shaped retaining part 12a is formed at the tip of the connecting member 12. The retaining part 12a is retained by the operating piece 3, thereby preventing the cover 5 from being lost. A notch 13 into which the connecting member 12 is fit is formed at the proximal periphery of the cover 5 so that the connecting member 12 is not obtrusive when the cover 5 is attached to the operating piece 3.

The cover 5 is made of a synthetic resin integrally.

Since the constructions of the other components of the directional control valve 1 and the manual operation mechanism are substantially the same as those of known ones and are not directly connected to the gist of the invention, specific description of them is omitted.

In the directional control valve 1 having the above construction, when the operating piece 3 is fit with the cover 5 in a state where the retaining part 12a at the tip of the connecting member 12 is retained by the operating piece 3, the hooks 10 and 10' are resiliently retained by the retaining grooves 7a or 7b on the outer surface of the operating piece 3. Consequently, the cover 5 is easily and securely attached so as not to be detached by vibration or the like. When the operating piece 3 is not pushed, that is, in a not-operated position, as shown in FIG. 2, the hooks 10 and 10' are retained by the lower retaining groove 7a. When the operating piece 3 is locked in the operation position in which the operating piece 3 is pushed, the hooks 10 and 10' are retained by the upper retaining groove 7b. In any case, since the height (H) of the cover 5 is equal to or higher than the height (h) of the operating piece 3 in the non-operating position, the operating piece 3 is in the cover 5 and does not project to the outside. Consequently, even when a hand or other matter touches the cover 5, the operating piece 3 is not inadvertently pressed down or returned to the original position.

Since the transparent opening 6 is formed at the top of the cover 5, by seeing the direction of the mark 3a at the top of the operating piece 3 through the transparent opening 6, the operating position of the operating piece 3 can be easily recognized.

At the time of operating the operating piece 3, the cover 5 is detached. Since the finger catching projections 11 and 11' are formed on the outer face of the cover 5, when the cover 5 is pulled out with fingers retained by the projections, the hooks 10 and 10' are resiliently detached from the retaining groove 7a or 7b and the cover 5 is easily detached.

Since the cover 5 is connected to the operating piece 3 by the connecting member 12, even when the cover 5 is detached from the operating piece 3, it is not dropped in a narrow gap around the device or lost.

Although the cover 5 is provided for each of the operating pieces 3 in the first embodiment, when two operating pieces 3 and 3' are provided close to each other as shown in the diagram, the two covers 5 and 5 may be integrally formed. In the second embodiment shown in FIG. 3, the two covers which are integrally formed are shown.

Figure 3:
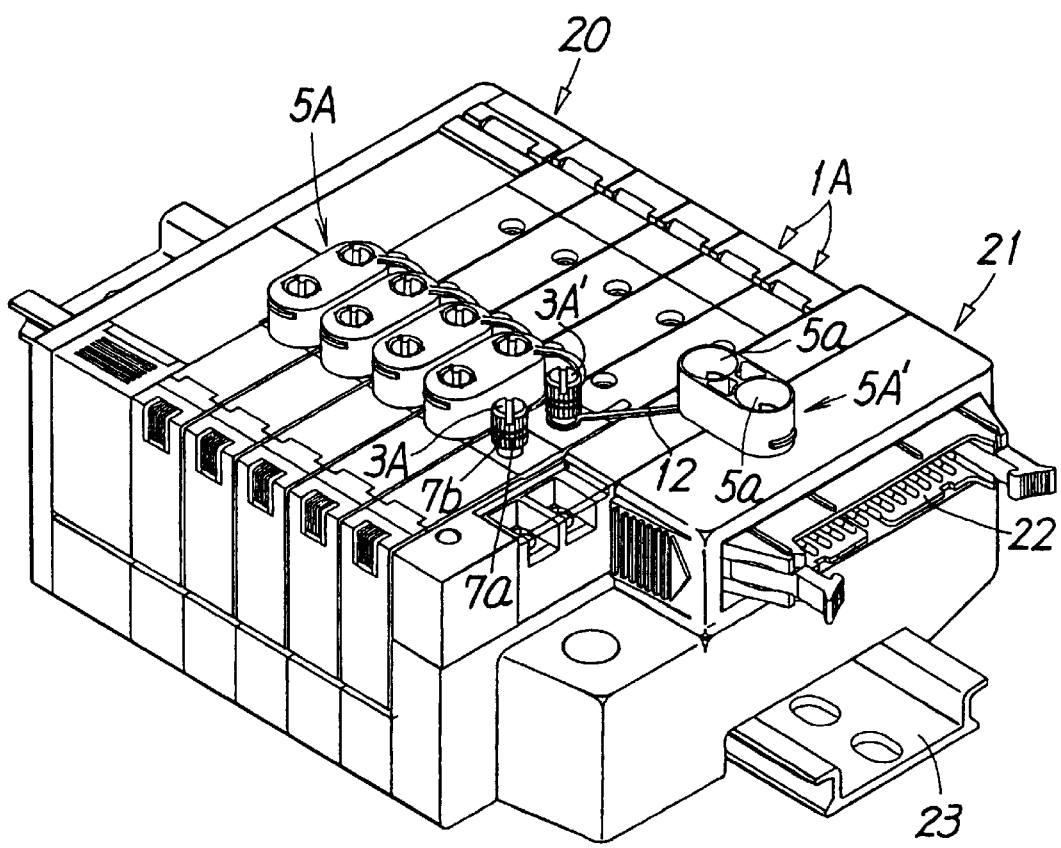
FIG. 3 is a perspective view showing a second embodiment of the invention.

Specifically, FIG. 3 shows that a plurality of directional control valves 1A having the plurality of operating pieces 3A and 3A which are positioned close to each other and an integral cover 5A being attached on the plurality of operating pieces 3A and 3A are integrally mounted on one rail 23 together with a port block 20 having a supply port and an exhaust port which are commonly used and a power supply block 21 having a plug 22 for connecting electric wire.

The operating piece 3A can be locked in an operation position in a manner similar to the operating piece 3 of the first embodiment. The upper and lower retaining grooves 7a and 7b are formed on the outer face of the operating piece 3.

The integral cover 5A is obtained by integrally forming two covers 5a and 5a' corresponding to two operating pieces 3A and 3A' and has one connecting member 12. The integral cover 5A is connected to one of the operating pieces 3A and 3A' by the connecting member 12 and is used. The construction of each cover 5A is substantially the same as that of cover 5 of the first embodiment.

In the foregoing embodiments, the upper and lower retaining grooves 7a and 7b are formed on the outer face of each of the operating pieces 3A and 3A' so that the operating pieces 3A and 3A' can be locked in the operating positions. The operating pieces 3A and 3A' may not be the lock type but can be in the operating positions while being pushed by a hand and return to non-operating positions by a spring force. In this case, it is sufficient to form only the lower retaining groove 7a.

Obviously, the invention can be also applied to a fluid pressure control device except for the control valve as described above.

According to the fluid pressure control device of the invention, the cover for preventing misoperation can be easily and certainly attached/detached to/from the operating piece. Even when the cover is detached for a manual operation, there is no possibility of loosing the cover.

What is clamed is:

1. A fluid pressure control device for preventing misoperation, comprising an operating piece mounted on a body of the fluid pressure control device so as to be projected away from said body and configured to provide manual operation for said device; and a cover configured to prevent misoperation and detachably connected to the operating piece, wherein the operating piece comprises at least one retaining groove on an outer face of the operating piece, and the cover comprises a cylindrical shaped object having a transparent opening through which the top of the operating pi is seen when the cover is attached to the operating piece, a hook mounted on the inside of the cylindrical shaped object so as to be resiliently retained by the retaining groove of the operating piece when the cover is attached to the operating piece, and a string-shaped connecting member having a first end connected to an outer part of the cylindrical shaped object and configured to prevent the cover from being lost and a second end connected to the operating piece, wherein and the height of the cover is equal to or higher than that of the operating piece when the operating piece is in a non-operating position.

2. The fluid pressure control device according to claim 1, wherein the hook of the cover is formed at a tip of each of a plurality of resilient pieces extending from said transparent opening to a proximal part inside the cover.

3. The fluid pressure control device according to claim 1, wherein the first end of the connecting member is extended from a top of the cover defined by said transparent opening, a retaining part detachably connected to the operating piece, and said notch includes a notch into which the connecting member is fit n the cover is attached to the operating piece by way of the retaining part.

4. The fluid pressure control device according to claim 1, wherein a finger catching projection by which the cover is easily pinched at the time of attachment or detachment is formed on an outer face of the cover.

5. The fluid pressure control device according to claim 1, wherein the operating piece is configured to be locked in the position in which the operating piece is pushed, and has upper and lower retaining grooves on the outer face of the operating piece thereby enabling the cover to be retained in both of the operating position and a non-operating position.

6. The fluid pressure control device according to claim 1, further comprising a plurality of operating pieces mounted on the fluid pressure control device so as to be close to each other, and a plurality of integrally formed covers corresponding to the operating pieces.

7. The fluid pressure control device according to claim 1, wherein the hook of the cover is formed at a tip of each of a plurality of resilient members extending from said transparent opening to a proximal part inside the cover, the first end of the connecting member is extended from a top of the cover defined by said transparent opening and the second end includes a retaining part detachably connected to the operating piece, said cover including a notch into which the connecting member is fit when the cover is attached to the operating piece by way of the retaining part, and a finger catching projection by which the cover is easily pinched at the time of attachment or detachment is formed on an outer face of the cover.

8. The fluid pressure control device according to claim 7, wherein the operating piece is configured to be locked in the position in which the operating piece is pushed, and has upper and lower retaining grooves on the outer face of the operating piece thereby enabling the cover to be retained in both of the operating position and a non-operating position.

9. The fluid pressure control device according to claim 7, further comprising a plurality of operating pieces mounted on the fluid pressure control device so as to be close to each others and a plurality of integrally formed covers corresponding to the operating pieces.

10. The fluid pressure control device according to claim 8, further comprising a plurality of operating pieces mounted on the fluid pressure control device so as to be close to each other, and a plurality of integrally formed covers corresponding to the operating pieces.

11. A fluid pressure control device for preventing misoperation, comprising:

means for manually operating said fluid pressure control device;

means for covering said means for manually operating so as to prevent misoperation of said fluid pressure control device;

means for resiliently retaining said means for covering in a position covering said means for manually operating such that said misoperation is prevented; and means for maintaining connection between said fluid control device and said means for covering when said means for covering is not resiliently retained in said position covering said means for manually operating.

* * * * *